(12) United States Patent
Sastry

(10) Patent No.: US 7,813,316 B2
(45) Date of Patent: Oct. 12, 2010

(54) LOAD BALANCING FOR MOBILE IP HOME AGENTS

(75) Inventor: Venkateshwara Sastry, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 653 days.

(21) Appl. No.: 11/768,727

(22) Filed: Jun. 26, 2007

(65) Prior Publication Data

US 2009/0003264 A1    Jan. 1, 2009

(51) Int. Cl.
*H04W 4/00* (2009.01)
(52) U.S. Cl. ............... 370/328; 370/338; 370/401
(58) Field of Classification Search ............ None
See application file for complete search history.

(56) References Cited

U.S. PATENT DOCUMENTS

| | | | |
|---|---|---|---|
| 6,430,698 B1* | 8/2002 | Khalil et al. | 714/4 |
| 6,795,705 B1* | 9/2004 | Warrier et al. | 455/435.1 |
| 2002/0067704 A1* | 6/2002 | Ton | 370/329 |
| 2002/0114323 A1* | 8/2002 | Chowdhury et al. | 370/352 |
| 2004/0021901 A1* | 2/2004 | Watanabe | 358/1.15 |
| 2004/0098507 A1* | 5/2004 | Thubert et al. | 709/245 |
| 2004/0202126 A1* | 10/2004 | Leung et al. | 370/331 |
| 2007/0104146 A1* | 5/2007 | Hossain et al. | 370/331 |
| 2007/0245007 A1* | 10/2007 | Tsirtsis et al. | 709/223 |
| 2008/0039079 A1* | 2/2008 | Iyer et al. | 455/432.1 |

OTHER PUBLICATIONS

C. Perkins, "IP Mobility Support for IPv4", Network Working Group, Request for Comments: 3344, Aug. 2002, 93 pages.

* cited by examiner

*Primary Examiner*—Ajit Patel
(74) *Attorney, Agent, or Firm*—Trellis IP Law Group, PC

(57) ABSTRACT

In one embodiment, mobile nodes may be pre-provisioned with a static home agent address and a static home address. The home agent address may be the same for all the mobile nodes. The home address may be a unique identifier for the mobile node in a network. A registration request from a mobile node may be sent to the home agent address. A load balancer may be configured to receive the registration request at the home agent address. The load balancer is then configured to determine a home agent in the plurality of home agents to send the registration request to. The load balancer determines which home agent to send the request to based on the home address for the mobile node. The load balancer then sends the request to the determined home agent.

20 Claims, 3 Drawing Sheets

LOAD BALANCING FOR MOBILE IP HOME AGENTS

TECHNICAL FIELD

Particular embodiments generally relate to networking.

BACKGROUND

In mobile Internet Protocol (IP), mobile nodes are pre-provisioned with a home agent address. When a mobile node roams to a visited network, a client may attach to a foreign agent. The mobile node would then register with the home network via a foreign agent care-of address. The care-of-address is used by the home agent to send messages to the mobile node. A registration request (RRQ) will then be sent to the pre-provisioned home agent address.

It is likely that millions of mobile nodes are pre-provisioned with the same home agent address. This means that a single physical device must handle the millions of mobile nodes. With a large number of clients roaming to visiting networks, the single physical device may not be able to handle the registration for all of the mobile nodes. However, because the mobile nodes are pre-provisioned with the home agent address, all the registration requests are sent to the single physical device. Thus, the home agent may become overloaded and some of the registration requests may not be timely processed.

DESCRIPTION OF EXAMPLE EMBODIMENTS

Overview

In one embodiment, mobile nodes may be pre-provisioned with a static home agent address and a static home address. The home agent address may be the same for all the mobile nodes. The home address may be a unique identifier for the mobile node in a network. A registration request from a mobile node may be sent to the home agent address. A load balancer may be configured to receive the registration request at the home agent address. The load balancer is then configured to determine a home agent in the plurality of home agents to send the registration request to. The load balancer determines which home agent to send the request to based on the home address for the mobile node. For example, the home addresses may be configured in a subnet. Different home agents may be responsible for processing requests for different ranges of a subnet. Thus, a home agent is determined based on the position in the subnet that the home address falls within. The load balancer then sends the request to the determined home agent. This home agent will then be the home agent that facilitates communications with the mobile node.

Example Embodiments

Figure 1:
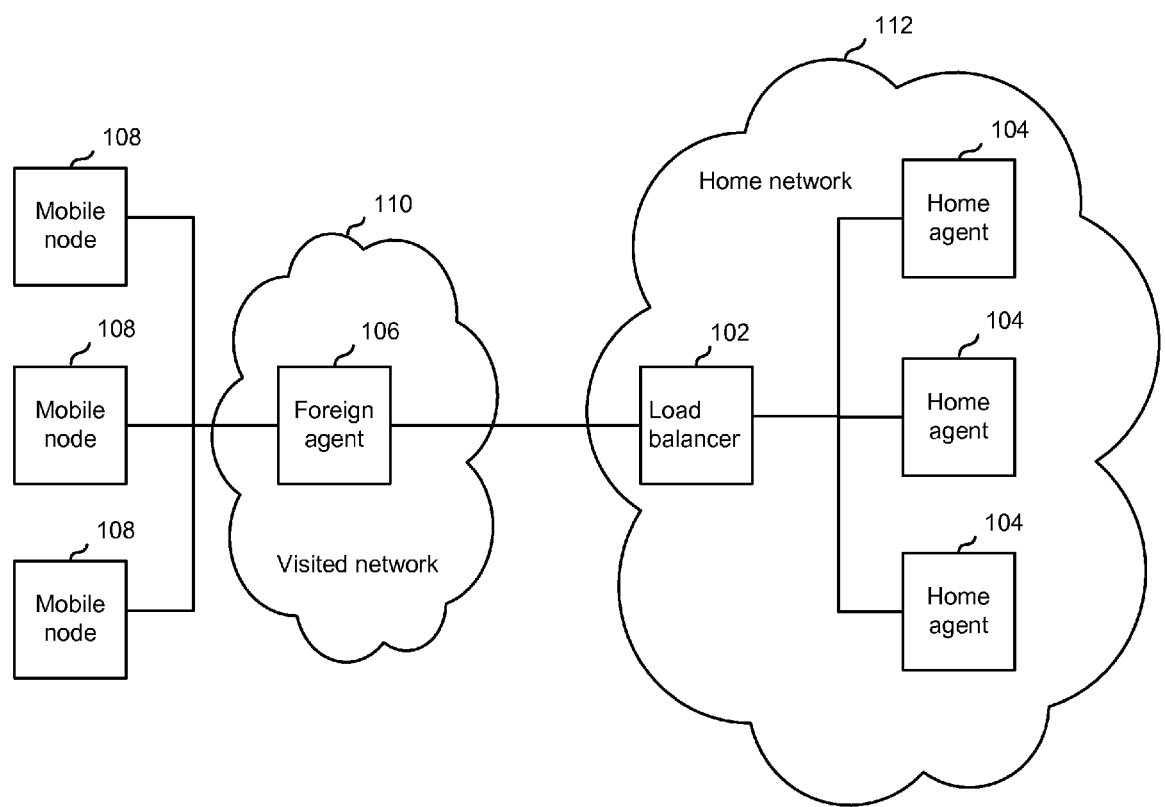
FIG. 1 depicts an example of a system for load balancing requests from mobile nodes.

FIG. 1 depicts an example of a system for load balancing requests from mobile nodes. As shown, a load balancer 102, home agents 104, a foreign agent 106, mobile nodes 108, a visited network 110, and a home network 112 are provided.

Mobile nodes 108 may be any mobile device. For example, mobile nodes 108 may include a cellular phone, laptop computer, personal digital assistant (PDA), personal PC, portable email device, smart phone, etc.

Home agent 104 may be a network device (e.g., a router) in home network 112 that tunnels messages for delivery to mobile node 108 when it is away from its home network 112. Home agent 104 also maintains current location information from mobile node 108. For example, when mobile node 108 is attached to visiting network 110, home agent 104 tunnels messages to foreign agent 106 for sending to mobile node 108.

Foreign agent 106 may be a network device (e.g., a router) in visiting network 110. Foreign agent 106 provides routing services to mobile node 108 when it is registered with home network 112. Foreign agent 106 de-tunnels and delivers messages (e.g. datagrams, packets. etc.) that were tunneled by home agent 104 to mobile node 108. For datagrams sent by mobile node 108, foreign agent 106 serves as a default router for mobile node 108.

Mobile node 108 is pre-provisioned with a home address in home network 112. In one embodiment, the pre-provisioned home address is static and is not dynamically assigned when a registration request is received. When mobile node 108 is away from home network 112, a foreign care-of address is associated with mobile node 108. The care of address reflects the mobile node's current point of attachment (e.g., foreign agent 106). However, mobile node 108 uses its home address as its source address for all IP datagrams that it sends, which are then encapsulated by foreign agent 106 and tunneled to home load balancer 102.

Conventionally, mobile nodes may have been pre-provisioned with the same home agent address. The home agent address is used to send a registration request to a home agent. The registration process registers the mobile node's care-of address with its home agent such that the home agent can then direct messages to the foreign agent care-of-address for forwarding to mobile node 108. Because potentially a lot of mobile nodes are pre-provisioned with the same home agent address, a single home agent device may become overloaded with registration requests in addition to routing messages to mobile nodes.

Particular embodiments provide load balancer 102 and a plurality of home agents 104. Mobile nodes 108 may be configured with the same home agent address. However, mobile nodes are configured with different home addresses (e.g., IP addresses). For example, the home addresses may be addresses configured on a subnet. Accordingly, home agents 104 would serve a set of home addresses in the subnet only. Load balancer 102 is configured as a device that receives a message directed to the home agent's address configured on mobile nodes 108. Load balancer 102 is then configured to determine a home agent 104 that can handle the registration for mobile node 108. Home agent 104 is determined based on the range of addresses assigned to it. For example, if the home address for mobile node 108 falls within the range for home agent 104, it is assigned to that home agent 104.

Accordingly, load balancer 102 sends a registration request to a determined home agent 104, which can then process the registration request. For example, home agent 104 may send a registration reply to mobile node 108. Then, once registered, the determined home agent 104 can direct messages to mobile node 108 through foreign agent 106. For example, a care-of address is bound to mobile node 108 at home agent 104. The care-of-address may be an address for a foreign agent in a foreign network. The care-of address is used to route packets to mobile node 108 while it is attached to the foreign network. When messages are received for mobile node 108, then they are tunneled to foreign agent 106 for forwarding to mobile node 108.

Figure 2:
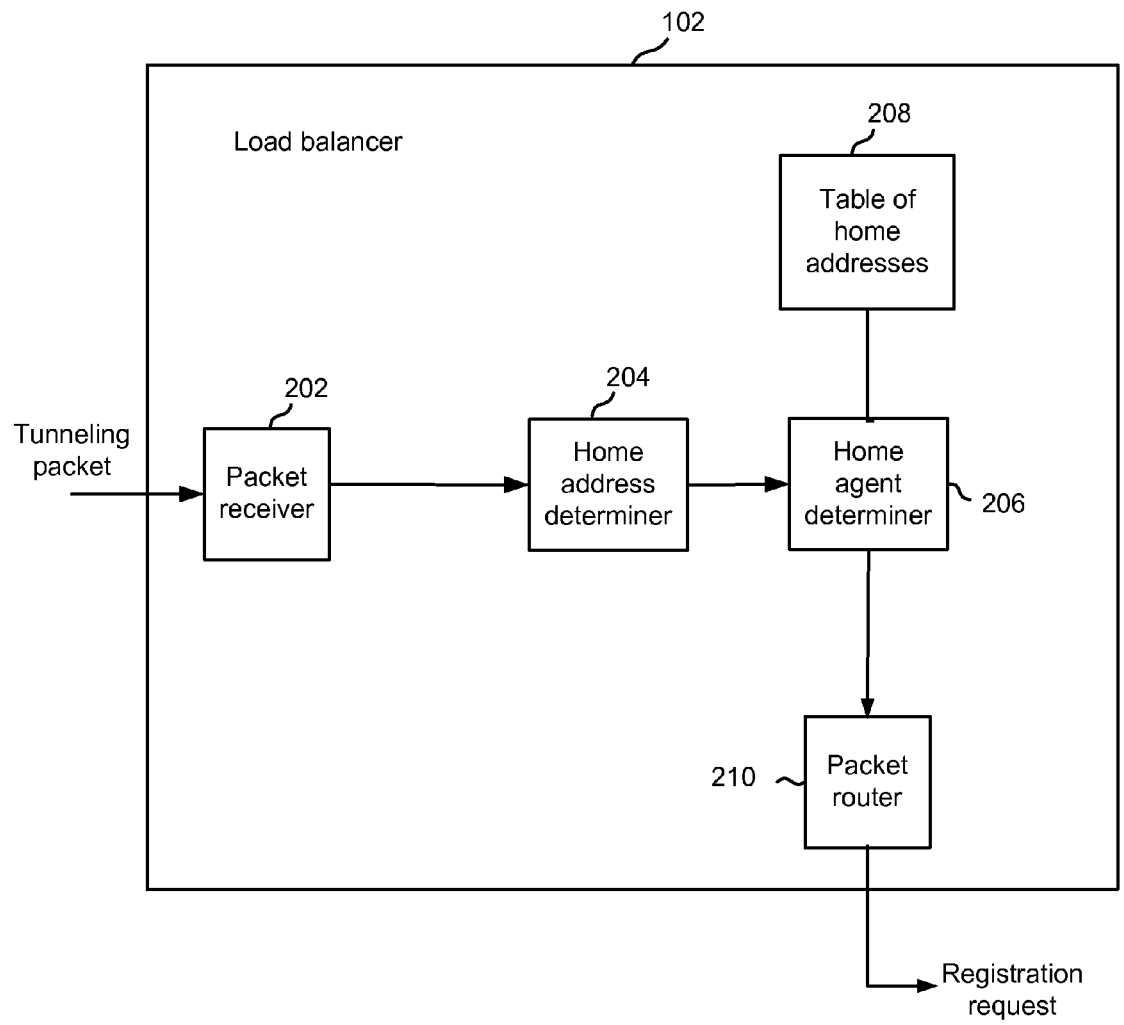
FIG. 2 depicts a more detailed embodiment of a load balancer.

FIG. 2 depicts a more detailed embodiment of load balancer 102. As shown, load balancer 102 includes a packet receiver 202, an IP address determiner 204, a home agent determiner 206, a table of home addresses 208, and a packet router 210.

Message receiver 202 is configured to receive a message from mobile node 108. For example, a registration request (RRQ) may be received when mobile node 108 attaches to foreign agent 106 and wants to register with home network 112. The registration request may be a packet that includes the pre-provisioned home address and home agent address for mobile node 108. The home agent address is used to send the registration request to load balancer 102.

The home address for mobile node 108 may be statically configured. That is, once it is configured, it does not change. In one embodiment, the home address is a network layer address (IP address) and is used to load balance registration requests. This avoids having to use server load balancing solutions that use gratuitous Address Resolution Protocol (ARP) to resolve a mobile node's IP address, which also require a home agent to support gratuitous ARP. In gratuitous ARP, an IP address for the mobile node is randomly assigned in addition to a home agent. This may not provide optimal load balancing because home agents may become overloaded due to random assignments. However, particular embodiments use a static pre-configured home address for mobile node 108 that is used to determine which home agent 104 should process the request. This allows home agents 104 to process requests from a set of mobile nodes 108. Accordingly, home agents 104 may not become overloaded because they are only assigned to a known set of mobile nodes 108.

Home address determiner 204 is configured to determine the home address from the message. For example, the registration request may have been tunneled from foreign agent 106 to load balancer 102. In one example, the registration request is encapsulated in a generic routing encapsulation (GRE) IP tunneling packet. GRE is a tunneling protocol designed to encapsulate network layer packets inside IP tunneling packets. The original registration request is found in a network layer packet, which is stored in the payload for the tunneling packet. Although GRE is described, other protocols may be used, such as IP in IP encapsulation, etc.

Home address determiner 204 may use deep packet inspection to review the network layer packet found in the tunneling packet to determine the home address for mobile node 108. Because the IP tunneling packet encapsulates the network layer packet, the home address is not found in a header of the IP tunneling packet. Also, the tunneling packet is sent to the home agent address from a source address of foreign agent 106. Thus, the header of the network packet may need to be inspected to determine the home address. For example, the source address of the registration request includes the home address of mobile node 108. This may require that home address determiner 204 decapsulate the tunneling packet and inspect the header of the network layer packet.

Home agent determiner 206 then determines the home agent to send the registration request to. For example, a table look-up in table 208 may be performed to determine the home agent 104. In one example, home addresses may be provisioned on a subnet. A subnetwork or subnet is a range of logical addresses within the address space that is assigned. Subnetting is a hierarchical partitioning of the network address space (and of the network nodes of an autonomous system) into several subnets. Routers constitute borders between subnets. Communication to and from a subnet is mediated by one specific port of one specific router, at least momentarily.

A subnet is a physical network served by load balancer 102. However, subnetting allows the network to be logically divided regardless of the physical layout of a network, since it is possible to divide a physical network into several subnets by configuring different home agents 104. The address to all nodes in a subnet starts with the same binary sequence, which is its network id and subnet id. In IPv4, the subnet may be identified by its base address and subnet mask. Subnetting simplifies routing, since each subnet typically is represented by one row in the routing tables in each connected router. For example, the first 100K home addresses on a subnet may be associated with a first home agent 104-1; the second 100K addresses on a subnet may be associated with home agent 104-2, etc. The home address subnet mapping may be implemented as an extension/modification to an access control (ACL) mapping or a class map with network-based application recognition (NBAR) as a classification criteria to determine the home agent 104.

Once the home agent 104 is determined, message router 210 routes the message to home agent 104. For example, the registration request is routed to home agent 104. Home agent 104 may then process the registration. For example, mobile node 108 may be authenticated and a registration reply may be sent to mobile node 108. The care-of address is bound to mobile node 108 and subsequent messages for mobile node 108 may be sent from the determined home agent 104 to mobile node 108 through foreign agent 106.

Figure 3:
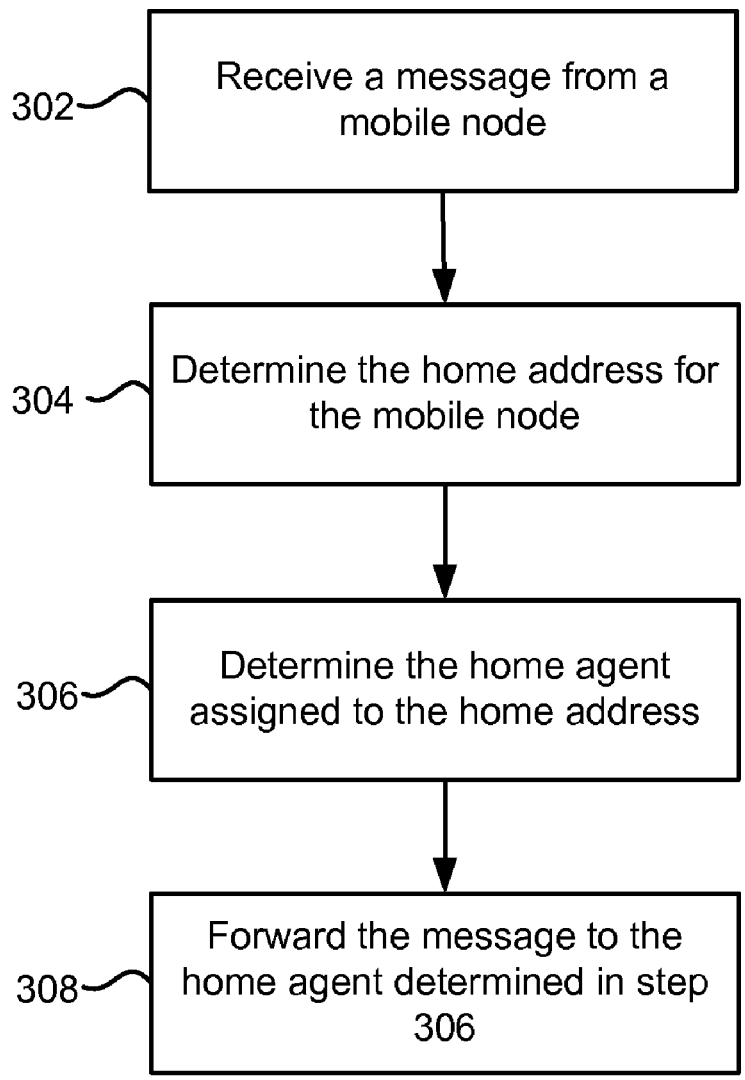
FIG. 3 depicts an example of a method for determining a home agent.

FIG. 3 depicts an example of a method for determining a home agent 104. Step 302 receives a message from mobile node 108. The message may be a registration request or any other message.

Step 304 determines the home address for mobile node 108. For example, a tunneling packet payload may be inspected to determine the home address in a network layer packet.

Step 306 then determines the home agent 104 assigned to the home address. For example, certain home agents 104 may be assigned to various sections of home addresses in a subnet.

Step 308 then forwards the message to home agent 104 determined in step 306.

Particular embodiments provide many advantages. For example, mobile nodes 108 may be configured with the same home agent address. However, the home agent address goes to load balancer 102, which can then select home agents 104 to send the registration requests to. Because load balancer 102 can forward requests from mobile node 108 to a number of home agents 104, scalability is provided. As more mobile nodes 108 are added to a network, more home agents 104 may be added to home network 112. Mobile nodes 108 may still be configured with the same home agent address, but each mobile node 108 will have different home addresses and can be load balanced efficiently.

Although the description has been described with respect to particular embodiments thereof, these particular embodiments are merely illustrative, and not restrictive. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

I claim:

1. A method comprising:

receiving a message from a mobile node at a load balancer in a home network for the mobile node, the message including a destination of a first address, wherein a plurality of mobile nodes are statically pre-provisioned with the first address;

determining a home address for the mobile node from the message, the home address being statically pre-provisioned on the mobile node;

determining a home agent in a plurality of home agents for the mobile node based on the home address, the determined home agent being at a second address; and sending the message to the determined home agent, wherein the determined home agent is assigned to a subset of home addresses and serves a subset of mobile nodes that are associated with the subset of home addresses.

2. The method of claim 1, wherein the message comprises a registration request for the mobile node, the mobile node being attached to a foreign network.

3. The method of claim 1, wherein the message comprises a tunneled packet, the method further comprising:

determining a network layer packet encapsulated in the tunneled packet; and determining the home address from the network layer packet.

4. The method of claim 1, wherein the first address comprises a home agent address.

5. The method of claim 1, wherein determining the home agent comprises:

determining a section of a subnet the home address falls within; and determining which home agent is assigned to process messages from the section of the subnet.

6. The method of claim 5, wherein determining which home agent comprises mapping the home agent address to a subnet serviced by the home agent.

7. The method of claim 1, wherein the home address is unique to the mobile node.

8. An apparatus comprising:

one or more processors; and logic encoded in one or more tangible media for execution by the one or more processors, and when executed operable to:

receive a message from a mobile node at a load balancer in a home network for the mobile node, the message including a destination of a first address, wherein a plurality of mobile nodes are statically pre-provisioned with the first address;

determine a home address for the mobile node from the message, the home address being statically pre-provisioned on the mobile node;

determine a home agent in a plurality of home agents for the mobile node based on the home address, the determined home agent being at a second address; and send the message to the determined home agent, wherein the determined home agent is assigned to a subset of home addresses and serves a subset of mobile nodes that are associated with the subset of home addresses.

9. The apparatus of claim 8, wherein the message comprises a registration request for the mobile node, the mobile node being attached to a foreign network.

10. The apparatus of claim 8, wherein the message comprises a tunneled packet, wherein the logic when executed is further operable to:

determine a network layer packet encapsulated in the tunneled packet; and determine the home address from the network layer packet.

11. The apparatus of claim 8, wherein the first address comprises a home agent address.

12. The apparatus of claim 8, wherein the logic configured to determine the home agent comprises logic that, when executed, is operable to:

determine a section of a subnet the home address falls within; and determine which home agent is assigned to process messages from the section of the subnet.

13. The apparatus of claim 12, wherein the logic to determine which home agent comprises logic that, when executed, is operable to map the home agent address to a subnet serviced by the home agent.

14. The apparatus of claim 8, wherein the home address is unique to the mobile node.

15. A system comprising:

a plurality of mobile nodes statically pre-provisioned with a first address and a home address, the first address being the same for the plurality of mobile nodes and the home address being different for each mobile node in the plurality of mobile nodes;

a load balancer configured to receive a message from a mobile node in the plurality of mobile nodes, the message including a destination of the first address, the load balancer configured to determine the home address for the mobile node from the message; and a plurality of home agents configured to process messages for a set of home addresses, wherein the load balancer is configured to determine a home agent in the plurality of home agents for the mobile node based on the home address, the determined home agent being at a second address, wherein the determined home agent is assigned to a subset of home addresses and serves a subset of mobile nodes that are associated with the subset of home addresses.

16. The system of claim 15, wherein the load balancer is further configured to send the message to the determined home agent.

17. The system of claim 15, wherein the message comprises a registration request for the mobile node, the mobile node being attached to a foreign network.

18. The system of claim 15, wherein the message comprises a tunneled packet, wherein the load balancer is configured to:

determine a network layer packet encapsulated in the tunneled packet; and determine the home address from the network layer packet.

19. The system of claim 15, wherein the first address comprises a home agent address.

20. The system of claim 15, wherein the plurality of home agents are assigned to process messages from a different section of a subnet.

* * * * *